Jan. 24, 1961 G. J. KENNEDY ET AL 2,968,958

TUNING DEVICE WITH FINE TUNING MECHANISM

Filed Nov. 13, 1958

INVENTORS
GILBERT J. KENNEDY
ELMER W. WEBER, JR.

BY Albert H. Charland

ATTORNEY

United States Patent Office 2,968,958

Patented Jan. 24, 1961

2,968,958

TUNING DEVICE WITH FINE TUNING MECHANISM

Gilbert J. Kennedy, Jenkintown, and Elmer W. Weber, Jr., Philadelphia, Pa., assignors to Philco Corporation, Philadelphia, Pa., a corporation of Pennsylvania Filed Nov. 13, 1958, Ser. No. 773,614

5 Claims. (Cl. 74—10.8)

The invention herein disclosed and claimed relates to mechanical drive systems and more particularly to mechanisms adapted to provide a differential speed drive. Specifically the invention has to do with an improved rotary drive arrangement which, although suitable for use with various kinds of rotatably driven devices, is especially useful when employed as means for effecting adjustments of channel selectors or tuners of the type customarily employed in television receivers.

It is common practice to provide a television receiver with mechanism which is capable of rapidly adjusting the channel selecting means to provide "coarse tuning" that is tuning of the receiver roughly to a desired channel, and which is also capable of slowly adjusting the channel selecting means to provide "fine tuning" that is tuning of the receiver precisely to the selected channel.

Mechanisms of the above mentioned variety are generally driven by means of manually actuated instrumentalities which preferably and usually are rotatable in both clockwise and counterclockwise directions and, for convenience and ease of operation, it is desirable that rotation in both directions and for both coarse and fine tuning be accomplished through manipulating means disposed at one location on the receiver cabinet. However the provision of mechanisms having the above desired features, gives rise to manufacturing complexities and problems particularly because such mechanisms generally necessitate intricate driving and coupling structures including toothed gear arrangements, cord-and-pulley devices, elaborate clutch assemblies, and the like. Such arrangements, devices or assemblies are expensive and add to the manufacturing and servicing costs.

Accordingly it is an object of the present invention to overcome the above mentioned complexities and problems by providing a novel reversely rotatable drive arrangement which utilizes simple driving and coupling elements capable of being readily associated with each other to provide an inexpensive assembled structure.

It is also an object of the present invention to provide an improved combination of driving elements cooperating to drive rotatable devices at different rates of speed without utilization of toothed gear trains, cord-and-pulley devices, or like motion transmitting arrangements.

A characteristic feature of a preferred form of the invention resides in the provision of a device which combines reversible coarse and fine tuning means, and which can be easily assembled and readily associated with a conventional tuner to adjust the same to various positions for the reception of available signals.

The invention is further characterized by the provision of a compact assembly of simple rotatable elements which constitute a frictional drive for effecting fine adjustments of a shaft-operated tuner.

Generally stated, the above noted as well as other objects and characteristic features of the invention are achieved by utilizing a pair of companion elements having confronting interengageable friction surface portions. One of these elements is mounted to undergo orbital displacement about the axis of rotation of a drive shaft on which the other of said elements is affixed. The orbital displacement of said one of said elements with respect to said other of said elements causes said shaft to rotate at slow speed. According to a specific embodiment of the invention as applied to a television tuner, the novel friction drive system incorporates companion discs mounted face to face and having circumferential surface portions which confront and frictionally engage each other. One of these discs is affixed to a main shaft which serves to drive the rotor of the tuner, and the other of said discs is journalled on an eccentric provided on an auxiliary shaft arranged concentrically with and rotatable about said main shaft. Rotation of the auxiliary shaft imparts orbital oscillatory motion to the eccentrically mounted disc which, in turn, rotates the other disc and its associated shaft to impart thereto an angular displacement which is a fraction of the angular displacement of the auxiliary shaft.

The invention, its objects, features and advantages, will be more fully understood from the following detailed description considered in conjunction with the accompanying drawings, in which.

Figures 1, 2, 3, 4:
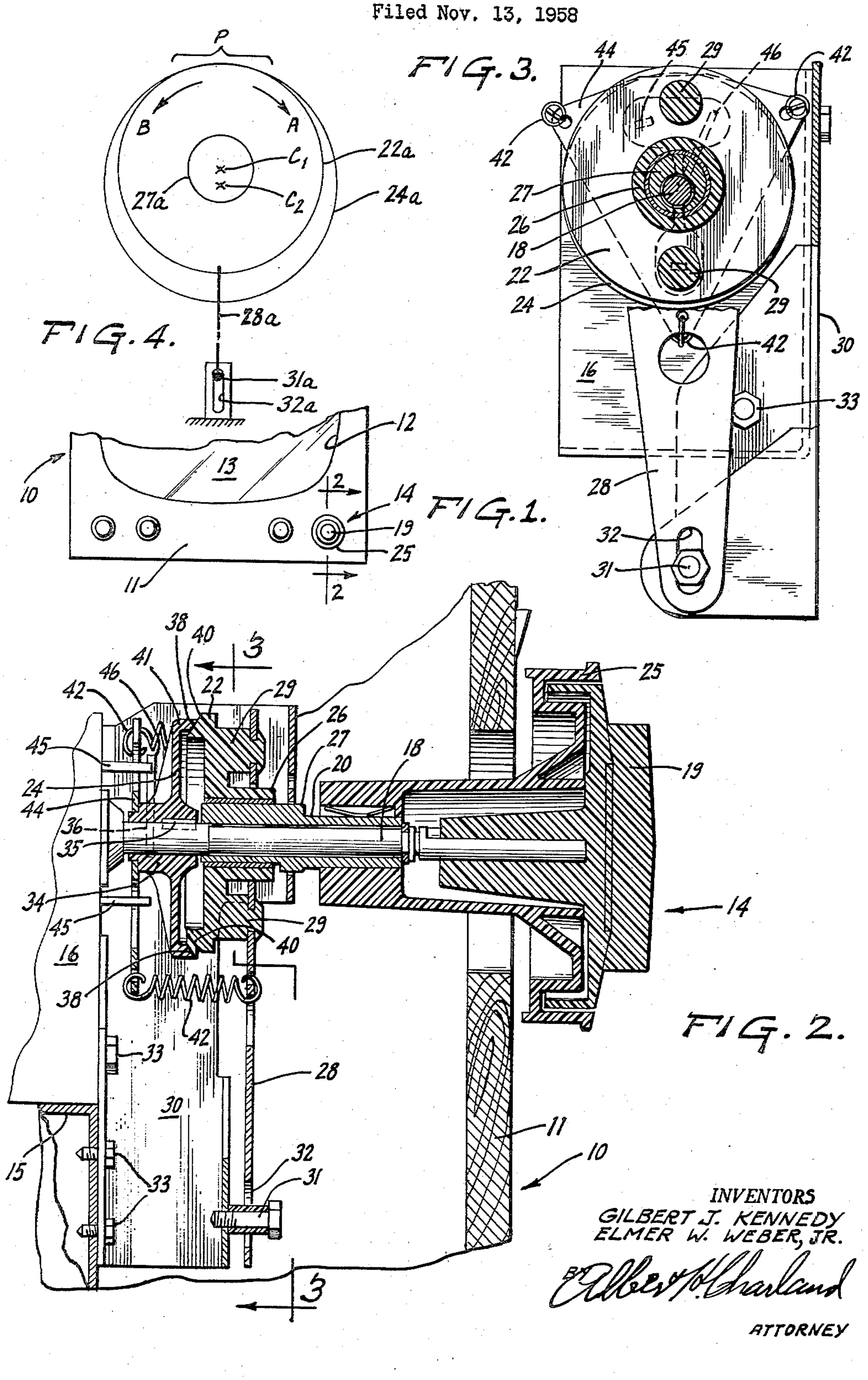
Figure 1 is a front elevational view of a television receiver supplied with a tuner-driving system constructed in accordance with the present invention.
Figure 2 is an enlarged fragmentary sectional view taken substantially on line 2—2 of Figure 1.
Figure 3 is an elevational sectional view of the driving mechanism, looking in the general direction of arrows 3—3 of Figure 2.
Figure 4 is a diagrammatic view illustrating certain characteristic operational features of the invention.

While, as mentioned above, the drive system of this invention may be utilized with various types of devices, the principles of the invention are particularly applicable to tuning apparatus for signal receivers. Accordingly, the specific embodiment herein given by way of example, is illustrated and will be described in connection with a channel selector or tuner of a television receiver.

Having more particular reference to the drawing, there is shown in Figure 1 a conventional television receiver cabinet 10 having a front wall 11 provided with a viewing opening 12 which is fitted with the usual protective transparent panel 13. The controls of the receiver, including a manually operable channel-selector control 14, are conveniently arranged on the front wall 11 of the cabinet. As seen in Figure 2, the cabinet encloses a chassis 15 which is of usual construction and is designed to carry the customary electronic components, including a channel selector or tuner 16 adapted for adjustment to the desired channel by rotation of a main drive shaft 18 included in the control 14.

The electrical and mechanical details of the apparatus by means of which the tuner is tuned to a selected channel will not be described herein since such details are not essential parts of this invention and may be of conventional variety. For example, rotation of the shaft 18 may result in adjustment of a variable condenser, in tuning of a resonant cavity, or in any other suitable change in the circuit elements which make up the tuner.

Coarse tuning is accomplished by rotation of the main drive shaft 18 directly and, for that purpose, a manipulator or knob 19 is rigidly connected to said shaft. Thus, manual rotation of the knob 19 in either clockwise or counterclockwise direction imparts similar motion to said shaft which in turn drives the tuner mechanism at a one-to-one ratio.

The fine tuning mechanism which constitutes the essence of the present invention, is mechanical in character and results in slow finely controlled movement of the main shaft 18. As illustrated, this mechanism comprises an auxiliary rotatable shaft 20 and means, including interengageable companion driving elements in the form of confronting discs 22 and 24, for establishing a differential drive between said auxiliary shaft and the main shaft 18.

The auxiliary shaft is hollow to fit over an intermediate portion of the main shaft 18 and is rotated about the axis of rotation of said main shaft in response to actuation of a manipulator or knob 25. This manipulator or knob is disposed concentrically with respect to the knob 19 of the main shaft 18, and is rigidly affixed to the auxiliary shaft 20 so that the latter is rotated either clockwise upon rotation of the knob 25 in clockwise direction, or counterclockwise upon rotation of said knob 25 in counterclockwise direction.

The driving element or disc 22 of the differential drive means has a centrally disposed hub 26 which is journalled on a cam or eccentric section 27 provided on the auxiliary shaft 20. This eccentric section 27 is adapted to rotate freely within the hub 26 of the driving disc 22, the latter being restrained against rotation with said section. For that purpose there is provided an elongated arm 28, the disc 22 being rigidly attached to one end portion of said arm as by means of bosses 29 formed on said disc and engaging said end portion. The other end portion of said arm is pivotally anchored on a supporting bracket 30 by means of a bolt or headed pin 31 which loosely passes through a slot 32 in said other end portion of the arm 28, the bracket 30 being secured to the chassis 15 and tuner 16, as by means of screw-threaded fastening elements 33.

Because of the construction above described, it will be understood that while the arm 28 restrains the driving element or disc 22 from rotation, the slot-and-pin attachment of the arm allows said disc to undergo orbital oscillatory motion about the main shaft 18 due to the camming action of the eccentric section 27 which is rotated with the auxiliary shaft 20. This orbital oscillatory motion is utilized, in the manner presently described, to impart rotation to the main drive shaft at a speed slower than the speed at which said auxiliary shaft is rotated by manipulation of the knob 25.

As more clearly seen in Figure 2, the other driving element or disc 24 of the differential drive means is provided with a central hub 34 which mounts said disc 24 on the main drive shaft 18 and concentrically with respect thereto. The disc 24 is rigidly fixed in position on the main shaft as by means of a spline 35 and a locking pin 36 which traverses the hub 34 and extends into said shaft. As shown in said Figure 2, the disc 24 has a continuous annular surface 38 which confronts and is adapted for frictional engagement with a similar surface 40 on the previously described disc 22. These confronting surfaces 38 and 40 of the companion discs are correspondingly slanted or angled as seen in Figure 2, so that the surface 40 of disc 22 faces outwardly, whereas the surface 38 of disc 24 faces inwardly. In this manner, said disc 24 is in effect provided with a flange 41 the edge of which defines said surface 38 on which the surface 40 of said disc 22 rides. The two surfaces 38 and 40 are maintained forcibly in constant and positive frictional contact by means of tension springs 42 which are arranged at spaced intervals about said companion discs. One end of each of said springs is tied to the arm 28 which carries the disc 22, whereas the other end of each of said springs is tied to a plate 44 which bears upon the disc 24, said discs 22 and 24 being sandwiched between said arm and plate.

The above mentioned frictional contact between the companion discs 22 and 24 is restricted to a limited peripheral portion of said discs. The reason for this restricted contact will be best understood by referring to diagrammatic Figure 4. In this figure: the circle **22*a* the central axis of which is shown at C1, represents the effective surface of the disc 22; the circle 24*a* the central axis of which is shown at C2, represents the effective surface of the disc 24; the circle 27*a* represents the member or crank 27 which is free to rotate, eccentrically, about the center C2; the link 28*a* which extends from the circle 22*a*, represents the arm 28; and the pivotal slidable connection 31*a*—32*a* which permits displacement of said arm to provide for the hereinbefore described orbital oscillatory motion, represents the pin-and-slot attachment 31—32**.

From the diagrammatic representation, it will be noted that the surface represented by the circle **22*a* frictionally contacts the surface represented by the circle 24*a* only in the vicinity of a zone shown at P, when the parts are in the relative positions in the drawings. Because the eccentric swings on the central axis C2, the central axis C1 travels in a circle concentric with said axis C2, and circle 22*a* describes orbital motion about C2. However, the arm represented by the link 28*a* prevents turning motion of the disc represented by the circle 22*a*, but allows it to be displaced in the aforesaid orbital oscillatory motion which causes the frictional contact to advance from zone P either in the direction of arrow A or in the direction of arrow B, depending upon whether the eccentric is rotated clockwise or counterclockwise. This progressive advance of the frictional contact brings about the aforesaid fractional rotation of the disc represented by the circle 24*a***, for fine tuning purposes.

From the foregoing description of the fine tuning mechanism, it will be understood that manual rotation of the knob 25 rotates the auxiliary shaft 20 which in turn rotates the cam or eccentric 27. As hereinbefore indicated, rotation of said eccentric causes the pivotally anchored disc 22 to move in an orbital path about the main shaft 18. However, because the disc 22 is restrained against rotation, the driving force imparted to said disc by the eccentric 27, causes said disc to move in directions radial to the main shaft 18 and thereby to oscillate in an orbit corresponding to the throw of the eccentric. This orbital oscillatory motion in turn causes the disc 24 to be rotatably displaced through an angular distance which is a fraction of the total angular displacement of the manually rotated auxiliary shaft 20. Because the angular displacement of the disc 24 is less than the angular displacement of the driving auxiliary shaft 20, the rotational speed of the main shaft 18 which rotates with said disc 24 is slower than the rotational speed of said auxiliary shaft 20. This difference in angular distance or rotational speed brings about the fine tuning function of the above described arrangement when the knob 25 is manually actuated. Any particular desired speed differential can be obtained by proper selection of discs and cam eccentricity. It will be understood that during operation of the knob 19 to effect coarse tuning, the surface 38 of the disc 24 slips with respect to the surface 40 of disc 22. Thus, the latter disc 22 is not affected by rotation of the disc 24 during coarse tuning.

If desired, rotation of the main drive shaft 18 can be limited. For that purpose, suitable stop means is provided to arrest and prevent rotation of said shaft beyond a desired degree. In the illustrated embodiment, the stop means comprises abutments 45 carried on the casing of the tuner 16 and disposed in the path of an extension 46 of the locking pin 36.

From the foregoing description it will be appreciated that the invention provides a compact differential drive which requires a minimum number of simply constructed parts. Although the invention has been shown and described with reference to a specific embodiment, it will be understood that this embodiment is susceptible to structural variations within the scope of the subjoined claims.

What we claim is:

1. In a tuning device provided with a rotatable tuning shaft which has means whereby said shaft can be rotated directly to effect coarse tuning, fine tuning mechanism comprising: an eccentric mounted on and rotatable about said shaft; a pair of frictionally interengageable discs, one disc being rigidly affixed to said shaft, the other disc being freely journalled on said eccentric; means in engagement with said other disc to restrain the latter against rotation while providing for orbital oscillatory motion thereof in response to rotation of said eccentric; and tensioning means connected with and resiliently maintaining said other disc in driving frictional engagement with said one disc whereby said other disc, through said orbital oscillatory motion, drives said one disc and said shaft at a rate slower than the rate at which said eccentric is rotated.

2. In a tuning device provided with a rotatable tuning shaft which has means whereby said shaft can be rotated directly to effect coarse tuning, fine tuning mechanism comprising: an eccentric mounted on and rotatable about said shaft; a pair of discs each having an annular slanting surface, one disc being rigidly affixed to said shaft, the other shaft being freely journalled on said eccentric; means in engagement with said other disc to restrain the latter against rotation while providing for orbital oscillatory motion thereof in response to rotation of said eccentric; and tensioning means connected with and urging said other disc to a position in which the mentioned slanting surface thereof is resiliently maintained in driving frictional engagement with the mentioned slanting surface of said one disc whereby said other disc, through said orbital oscillatory motion, drives said one disc and said shaft at a rate slower than the rate at which said eccentric is rotated.

3. In a tuning device provided with a rotatable tuning shaft which has means whereby said shaft can be rotated directly to effect coarse tuning, fine tuning mechanism comprising: an eccentric mounted on and rotatable about said shaft; a first disc rigidly affixed to said shaft and having a slanting inner rim surface; a second disc freely journalled on said eccentric and having a slanting outer rim surface; means in engagement with said second disc to restrain the latter against rotation while providing for orbital oscillatory motion thereof in response to rotation of said eccentric; and tensioning means connected with and urging said second disc to a position in which said outer rim surface thereof is resiliently maintained in driving frictional engagement with said inner rim surface of said first disc whereby said second disc, through said orbital oscillatory motion, drives said first disc and said shaft at a rate slower than the rate at which said eccentric is rotated.

4. In a tuning device provided with a rotatable tuning shaft which has an extended portion projecting from said device and means whereby said shaft can be rotated to effect coarse tuning, fine tuning mechanism comprising: an eccentric rotatably mounted on said extended shaft portion; a pair of frictionally interengageable discs, one disc being rigidly affixed to said shaft portion and disposed adjacent said eccentric, the other disc being freely journalled on said eccentric; a pivotal slidable link attached to said other disc to restrain the latter against rotation while providing for orbital oscillatory motion thereof in response to rotation of said eccentric; and springs connected to said link and cooperating therewith for resiliently maintaining said other disc in driving frictional engagement with said one disc whereby said other disc, through said orbital oscillatory motion, rotates said one disc and said shaft at a rate slower than the rate at which said eccentric is rotated.

5. In a tuning device provided with a rotatable tuning shaft which has an extended portion projecting from said device and terminating with a manually operable knob whereby said shaft can be rotated directly to effect coarse tuning, fine tuning mechanism comprising: an eccentric rotatably mounted on said extended portion of said shaft; another manually operable knob concentric with said coarse tuning knob and rigidly connected to said eccentric to rotate the same about said tuning shaft; a pair of frictionally interengageable discs, one disc being rigidly affixed to said shaft portion and disposed adjacent said eccentric, the other disc being freely journalled on said eccentric; a pivotal slidable link affixed to said other disc to restrain the same against rotation while providing for orbital oscillatory motion thereof in response to rotation of said eccentric; and springs connected to said link and cooperating therewith for resiliently maintaining said other disc in driving frictional engagement with said one disc whereby said other disc, through said orbital oscillatory motion, rotates said one disc and said shaft at a rate slower than the rate at which said eccentric is rotated through manipulation of said other knob.

References Cited in the file of this patent

UNITED STATES PATENTS

| | | |
|---|---|---|
| 886,938 | Brush | May 5, 1908 |
| 2,151,534 | Scofield | Mar. 21, 1939 |
| 2,370,992 | Perry et al. | Mar. 6, 1945 |
| 2,853,882 | Mason | Sept. 30, 1958 |

FOREIGN PATENTS

| | | |
|---|---|---|
| 249,805 | Great Britain | Oct. 14, 1926 |